(12) United States Patent
Borowski et al.

(10) Patent No.: US 8,042,704 B2
(45) Date of Patent: Oct. 25, 2011

(54) CONTAINER WITH MEASURING DEVICE HOLDING MEANS

(75) Inventors: Andrew E. Borowski, Saline, MI (US); Greg N. Dean, Canton, MI (US); Christopher T. Caldwell, Southgate, MI (US)

(73) Assignee: Plastipak Packaging, Inc., Plymouth, MI (US)

( * ) Notice: Subject to any disclaimer, the term of this patent is extended or adjusted under 35 U.S.C. 154(b) by 1761 days.

(21) Appl. No.: 11/039,426

(22) Filed: Jan. 19, 2005

(65) Prior Publication Data

US 2006/0156811 A1    Jul. 20, 2006

(51) Int. Cl.
*A47G 19/02* (2006.01)

(52) U.S. Cl. .............. 220/574.1; 220/212; 220/697; 248/37.3

(58) Field of Classification Search ........... 220/574.1, 220/212, 771, 695, 697, 735; 248/37.3
See application file for complete search history.

(56) References Cited

U.S. PATENT DOCUMENTS

| | | | | |
|---|---|---|---|---|
| 700,653 | A * | 5/1902 | Jobson | 215/227 |
| 1,393,574 | A * | 10/1921 | Rohmiller | 220/735 |
| 1,768,771 | A * | 7/1930 | La Tourrette | 141/380 |
| 2,205,726 | A * | 6/1940 | Lehman | 220/735 |
| 2,738,900 | A * | 3/1956 | Wenger | 141/380 |
| 3,168,962 | A * | 2/1965 | Rawlins et. al. | 220/697 |
| 3,722,779 | A * | 3/1973 | Chang | 220/574 |
| 4,095,716 | A * | 6/1978 | Meany | 215/391 |
| D309,550 | S * | 7/1990 | Pozzi | D7/505 |
| 5,042,712 | A * | 8/1991 | DeRoseau | 229/401 |
| 5,103,988 | A * | 4/1992 | Reil et al. | 215/384 |
| D337,920 | S * | 8/1993 | Rowe | D7/507 |
| 5,482,095 | A * | 1/1996 | de Chollet | 141/380 |
| 5,706,974 | A * | 1/1998 | Murdick et al. | 220/735 |
| 5,775,531 | A * | 7/1998 | Lowry | 220/212.5 |
| 5,927,538 | A * | 7/1999 | Collins | 220/574.1 |
| 7,040,500 | B2 * | 5/2006 | Kipperman et al. | 220/574.1 |

* cited by examiner

*Primary Examiner* — Anthony Stashick
*Assistant Examiner* — James N Smalley
(74) *Attorney, Agent, or Firm* — Dykema Gossett PLLC

(57) ABSTRACT

A container for holding a product including a holding means for removably holding a product measuring device adjacent the upper end of the container. The holding means is connected to the container and the measuring device may be replaced in the holding means to secure the measuring device therein during use of the product.

10 Claims, 3 Drawing Sheets

CONTAINER WITH MEASURING DEVICE HOLDING MEANS

BACKGROUND OF THE INVENTION

Containers, especially plastic containers, frequently require a measuring device or measuring scoop to correctly measure the needed amount of product therein. The measuring scoop is frequently sold with the product and immersed in the product. The desire is that the consumer can safely retrieve the measuring device from the product when the container is opened, and therefore safely use the device for accurately measuring needed product. Typical such products are baby formula, powdered juice mix, coffee, dry mix baking products, as pancake or biscuit mixes, laundry and dishwashing products and the like.

However, frequently the measuring device or scoop becomes immersed in the product, requiring the consumer to manually retrieve the device by immersing fingers or instruments in the product. This is clearly inconvenient and indeed may represent a health hazard.

Therefore, it is a principal objective of the present invention to overcome the foregoing disadvantage and provide a system for easily retrieving a measuring device from a product without the necessity of having the consumer retrieve the device from within the product.

It is a further objective of the present invention to provide a container and holding means for a measuring device which is convenient and easy for a consumer to use without compromising product safety.

Further objects and advantages of the present invention will appear hereinbelow.

SUMMARY OF THE INVENTION

In accordance with the present invention the foregoing objects and advantages are readily obtained.

In accordance with the present invention a container is provided, preferably a plastic container, which comprises: a hollow body for holding a product having a lower supporting base, a sidewall extending upwardly from the base, and an upper end above the sidewall with a dispensing opening therein; and holding means for removably holding a product measuring device adjacent the upper end of said container, said holding means being connected to said container. The measuring device, which preferably includes an elongated handle connected to a cup-like scoop, is removably retained by the holding means. The measuring device may be replaced in the holding means to secure the measuring device therein during use of the product.

The holding means can comprise a plate-like member or ledge connected to the container adjacent the upper end of the container, with the measuring device connected to the plate-like member. The holding means may include an opening or slot therein with the measuring device held in the opening. Alternatively, the holding means may include a pocket for holding the handle of the measuring device. As a further alternative the holding means may be on the container cover, which is part of the container. The cover may be integrally affixed to the container body or completely removable.

The shape of the container is not critical. For example, the container may be oval, square, round, or the like.

The container generally includes a cover which closes the dispensing opening of the container. The cover may be integrally attached or completely removable. In an alternate embodiment, the underside of the cover may include the holding means for holding the measuring device, such as a pocket for holding the handle of the measuring device.

Thus, the container of the present invention effectively retains the measuring device and avoids the problem of the measuring device falling beneath the surface of the contents of the container, especially if the product is a powdered or liquid product. Moreover, the container may include an opening, slot or pocket for retaining the measuring device after the container is opened.

Further features and advantages of the present invention will appear hereinbelow.

BRIEF DESCRIPTION OF THE DRAWINGS

The present invention will be more readily understandable from a consideration of the following illustrative drawings, wherein.

DETAILED DESCRIPTION OF PREFERRED EMBODIMENTS

Figure 2:
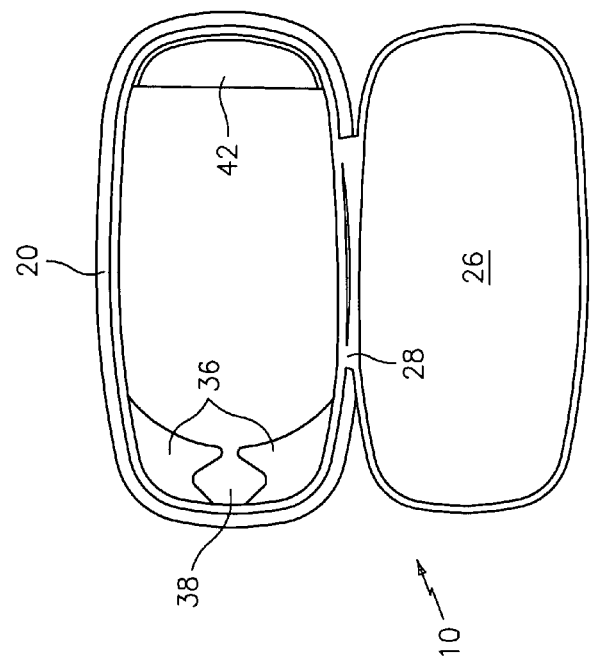
FIG. 2 is a top view of the container of FIG. 1.
Figure 1:
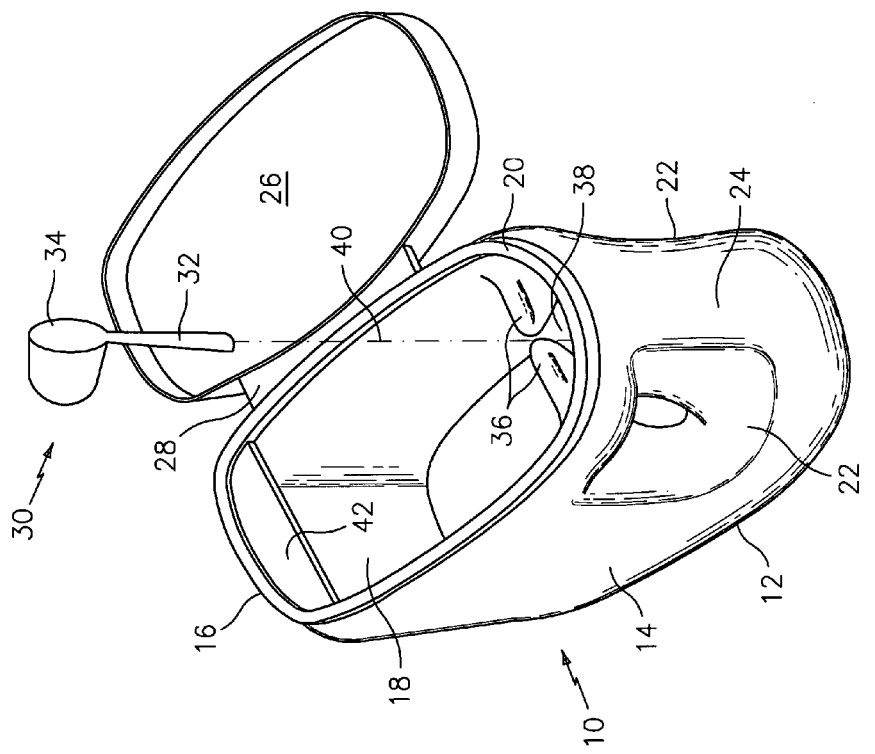
FIG. 1 is a perspective view of a container of the present invention with an opened, partly attached cover, with a measuring device positioned to be retained in a holding means connected to the container.

Referring to the drawings, FIGS. 1-2 represent one embodiment of the container of the present invention, with FIG. 1 showing a container with partly attached cover in the opened configuration and with a measuring device spaced above the container and positioned to be inserted in the measuring device holding means. FIG. 2 is a top view of the container of FIG. 1.

Container 10, which in this embodiment is an oval container and is preferably a plastic container typically constructed of a moldable plastic material such as polyethylene, polypropylene or polyethylene terephthalate, has a self-supporting base 12, sidewall or body portion 14 extending upwardly from the base, and an upper end or finish 16 above the sidewall and extending upwardly therefrom with a dispensing opening 18 therein. The upper end or finish 16 includes a flat annular lip 20 on the upper surface of the finish defining the dispensing opening 18. The sidewall or body portion provides a closed-end chamber suitable for containing the product to be dispensed. In the embodiment shown in FIGS. 1-2 the sidewall or body portion 14 includes recessed grip portions 22 which define an integral handle portion 24 for convenience in holding.

The container 10 includes cover 26 which closes the dispensing opening 18. As shown in the embodiment of FIGS. 1-2, the cover 26 may be partly connected to the upper end or finish 16, as by hinge member 28, or may be completely removable.

The product (not shown) in container 10 may be a powdered product, such as baby formula, sugar or powdered drink mix, or even a liquid product. These products often conveniently include in the container package a measuring device or scoop to measure the correct amount of product. Frequently, the measuring device becomes immersed in the product prior to opening the container due to shipment or handling. This may require that the consumer retrieve the device from under the upper surface of the product, which is inconvenient and possibly a health hazard. The present invention advantageously precludes this problem by providing the container with a holding means for holding the product measuring device adjacent the upper end of the container, with the holding means being connected to the container.

The measuring device 30 will generally have an elongated handle 32 connected to a cup-like scoop 34 which will usually include measuring lines (not shown) to enable the user to measure the exact amount of product desired.

In the embodiment of FIGS. 1-2, the holding means is a ledge or holding plate-like member 36 connected to the container adjacent the upper end 16 of container 10. The holding plate-like member 36 includes an opening 38 therein so that the measuring device 30 can be inserted therein as shown by dashed lines 40 and retained therein, with elongated handle 32 inserted in opening 38 and cup-like scoop 34, being larger than opening 38, being retained therein on the holding plate-like member 36. Therefore, the user can simply remove the measuring device when needed and replace same when not in use, without the inconvenience and possible hazard of the device becoming immersed in the product.

Optionally, a leveling plate-like member 42 is connected to the container adjacent upper end 16, and opposed to holding plate-like member 36 and extending across opening 18, which serves as a wiping blade for leveling the product on the measuring device.

Figure 3:
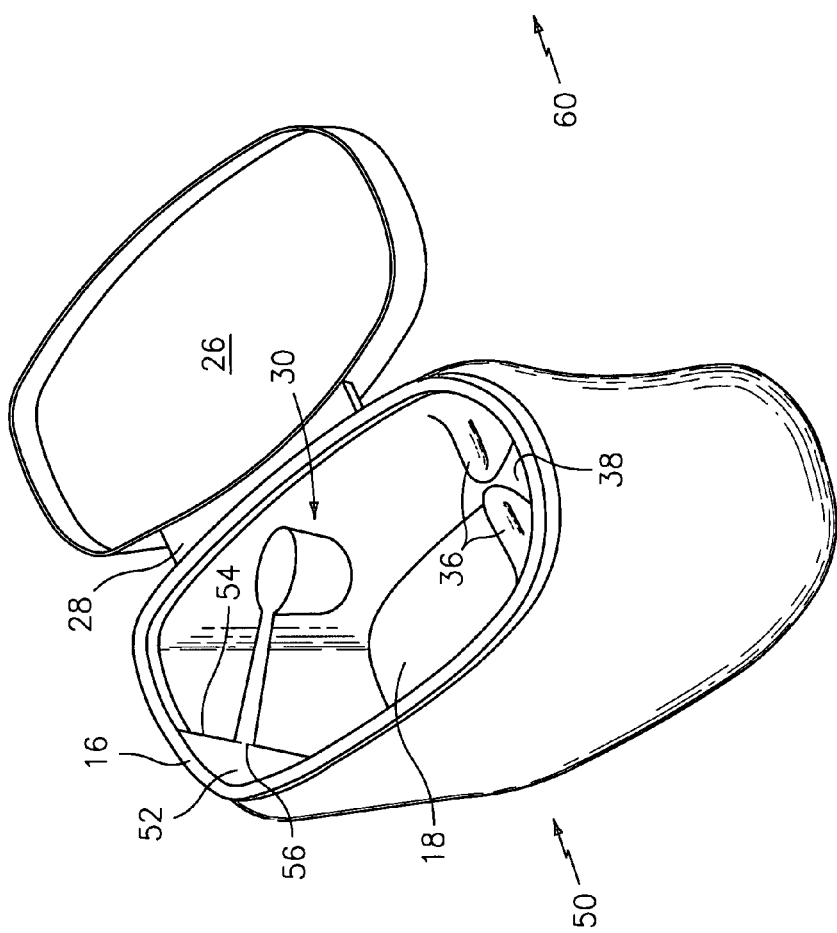
FIG. 3 is a perspective view of an alternate embodiment of the container of the present invention.

FIG. 3 is an alternate embodiment of the container of the present invention. Container 50 includes plate-like member or ledge 36 with opening 38 therein connected to the container adjacent the upper end thereof to hold measuring device 30, as in FIGS. 1-2. Similarly, container 50 is provided with cover 26 which is partly connected to upper end or finish 16 by hinge member 28, or may be completely removable, as in FIGS. 1-2.

However, container 50 includes a further leveling plate-like member 52 adjacent upper end 16 and opposed to holding member 36 which serves the same function as leveling member 42 in FIGS. 1-2, but oriented at a 45° angle with respect to dispensing opening 18. Also, measuring device 30 is removably retained on edge 54 of leveling member 52 by serrations 56 or a partial connection to permit easy removal of the measuring device 30. After removal the device can by retained in holding member 36.

Figure 4:
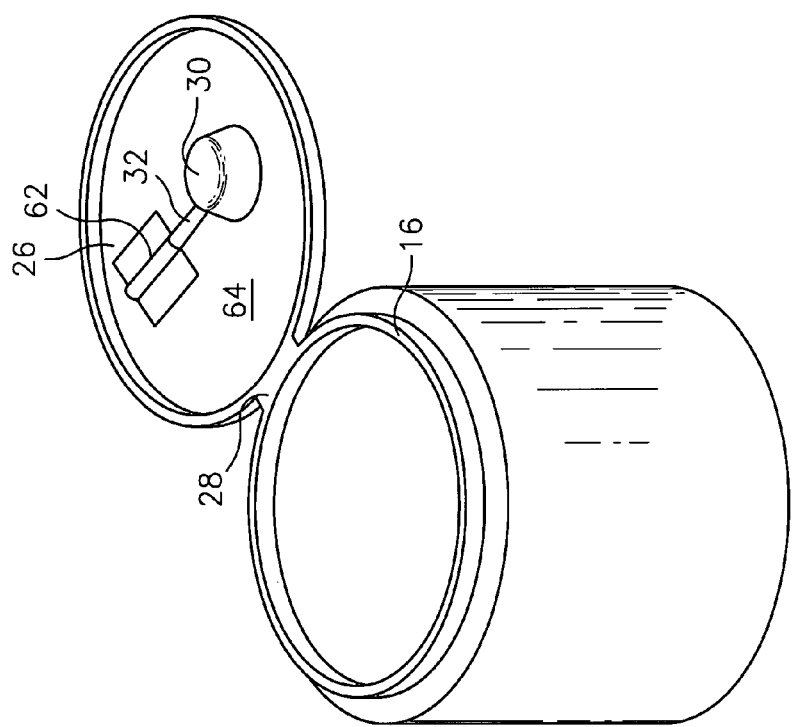
FIG. 4 is a perspective view of a still further embodiment of the container of the present invention.

The alternate embodiment of FIG. 4 shows round container 60 with cover 26 which is partly connected to upper end or finish 16 by hinge member 28, or may be completely removable. However, in this embodiment measuring device 30 is retained in pocket 62 on the underside 64 of cover 26 by inserting the elongated handle 32 into the pocket 62. After use the measuring device can be re-inserted in the pocket for safe retention.

Figure 5:
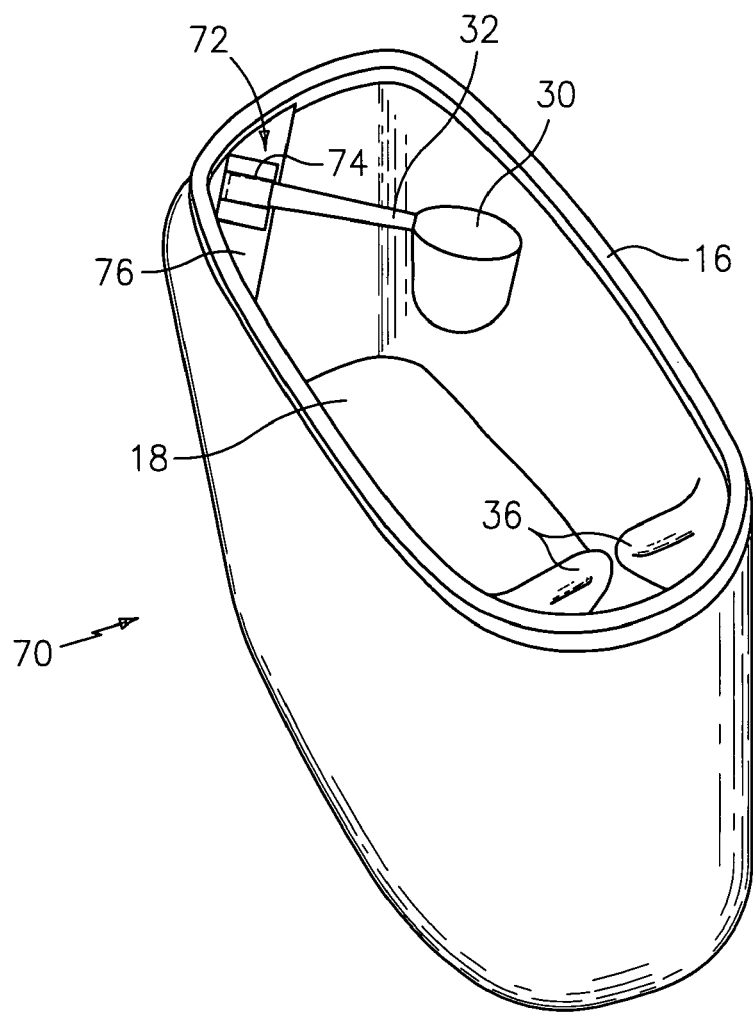
FIG. 5 is a perspective view of a still further embodiment of the container of the present invention.

The alternate embodiment of FIG. 5 shows an oval container 70 similar to the container of FIG. 3 with the leveling plate-like member 72 adjacent upper end 16 opposed to holding plate-like member 36, but oriented at a 45° angle with respect to dispensing opening 18. However, leveling member 72 includes pocket 74 on the upper side 76 of leveling member 72 for retention of measuring device 30 by inserting the handle 32 of device 30 into pocket 74 as shown. The measuring device can then be conveniently re-inserted in the pocket after use. In this embodiment the cover (not shown) is a removable cover.

Advantageously, the container of the present invention avoids the problem of the measuring device falling beneath the surface of the product and also enables convenient and safe storage of the measuring device during use.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A container which comprises:
   a plastic container having a hollow body for holding product with a lower supporting base, a sidewall extending upwardly from the base, and an upper end above the sidewall with a dispensing opening therein;
   and holding means for removably holding a product measuring device adjacent the upper end of the container, said holding means being connected to said container;
   wherein said measuring device includes an elongated handle connected to a cup-like scoop; and
   wherein said holding means comprises a plate-like ledge connected to said container adjacent the upper end of said container, with said plate-like ledge including an opening therein and with said measuring device removably retained in said opening with said handle inserted in said opening and with the cup-like scoop held on the plate-like ledge and wherein said container includes a plate-like member connected to said container adjacent the upper end of the container and spaced from the plate-like ledge, wherein the measuring device is removably retained on the plate-like member.

2. A container according to claim 1, wherein said container includes a cover for closing the dispensing opening.

3. A container according to claim 1, wherein said plate-like ledge is solely connected to said container adjacent the upper end of said container.

4. A container according to claim 1, wherein said cover is partly connected to said upper end.

5. A container according to claim 1, wherein said container is oval.

6. A container according to claim 1, wherein said container is round.

7. A container according to claim 1, wherein the sidewall includes recessed grip portions.

8. A container according to claim 1, wherein the cup-like scoop is larger than the opening on the plate-like ledge.

9. A container according to claim 1, wherein the plate-like member is oriented at an angle with respect to the dispensing opening.

10. A container which comprises:
    a plastic container having a hollow body for holding product with a lower supporting base, a sidewall extending upwardly from the base, and an upper end above the sidewall with a dispensing opening therein;
    and holding means for removably holding a product measuring device adjacent the upper end of the container, said holding means being connected to said container;
    wherein said measuring device includes an elongated handle connected to a cup-like scoop; and
    wherein said holding means comprises a plate-like ledge connected to said container adjacent the upper end of said container, with said plate-like ledge including an opening therein and with said measuring device removably retained in said opening with said handle inserted in said opening and with the cup-like scoop held on the plate-like ledge and wherein said container includes a plate-like member spaced from the plate-like ledge and connected to said container adjacent the upper end of said container as a leveling device for product held in the measuring device, wherein the measuring device is removably retained on the plate-like member.

* * * * *

UNITED STATES PATENT AND TRADEMARK OFFICE
CERTIFICATE OF CORRECTION

| | | |
|---|---|---|
| PATENT NO. | : 8,042,704 B2 | Page 1 of 1 |
| APPLICATION NO. | : 11/039426 | |
| DATED | : October 25, 2011 | |
| INVENTOR(S) | : Andrew E. Borowski et al. | |

It is certified that error appears in the above-identified patent and that said Letters Patent is hereby corrected as shown below:

COLUMN 4:
In claim 4, "A container according to claim 1" should be -- A container according to claim 2 --

Signed and Sealed this
Sixth Day of December, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,042,704 B2 | Page 1 of 1 |
| APPLICATION NO. | : 11/039426 | |
| DATED | : October 25, 2011 | |
| INVENTOR(S) | : Andrew E. Borowski et al. | |

It is certified that error appears in the above-identified patent and that said Letters Patent is hereby corrected as shown below:

COLUMN 4, line 30 (Claim 4, line 1)
"A container according to claim 1" should be -- A container according to claim 2 --

This certificate supersedes the Certificate of Correction issued December 6, 2011.

Signed and Sealed this
Third Day of January, 2012

David J. Kappos
*Director of the United States Patent and Trademark Office*